(12) United States Patent
Walter

(10) Patent No.: US 10,577,045 B2
(45) Date of Patent: Mar. 3, 2020

(54) BICYCLE CONVERSION KIT AND CARGO BICYCLE APPARATUS

(71) Applicant: Hauler Cycles, LLC, Traverse City, MI (US)

(72) Inventor: Christopher Jon Walter, Traverse City, MI (US)

(73) Assignee: Hauler Cycles, LLC, Traverse City, MI (US)

( * ) Notice: Subject to any disclaimer, the term of this patent is extended or adjusted under 35 U.S.C. 154(b) by 280 days.

(21) Appl. No.: 15/680,603

(22) Filed: Aug. 18, 2017

(65) Prior Publication Data

US 2018/0050755 A1 Feb. 22, 2018

Related U.S. Application Data

(60) Provisional application No. 62/377,263, filed on Aug. 19, 2016.

(51) Int. Cl.
| | |
|---|---|
| *B62K 19/40* | (2006.01) |
| *B62K 13/00* | (2006.01) |
| *B62K 7/02* | (2006.01) |
| *B62K 13/04* | (2006.01) |
| *B62K 5/02* | (2013.01) |

(Continued)

(52) U.S. Cl.
CPC ............. *B62K 19/40* (2013.01); *B62J 9/001* (2013.01); *B62K 3/02* (2013.01); *B62K 5/02* (2013.01); *B62K 5/08* (2013.01); *B62K 7/02* (2013.01); *B62K 13/00* (2013.01); *B62K 13/04* (2013.01); *B62K 21/02* (2013.01); *B62H 1/02* (2013.01); *B62K 21/12* (2013.01)

(58) Field of Classification Search
CPC ... B62K 3/02; B62K 5/02; B62K 5/08; B62K 7/02; B62K 13/00; B62K 13/04; B62K 21/02; B62J 9/001
USPC .......................................................... 280/202
See application file for complete search history.

(56) References Cited

U.S. PATENT DOCUMENTS 5,148,327 A * 9/1992 Gaxiola, Jr. ............. B62J 29/00
 248/479
7,686,115 B2 * 3/2010 Parker ..................... B62K 21/00
 180/219
(Continued)

FOREIGN PATENT DOCUMENTS

WO 2017124117 A1 7/2017
WO WO-2017124117 A1 * 7/2017 ............. B62K 27/12

*Primary Examiner* — Jacob D Knutson
(74) *Attorney, Agent, or Firm* — Marshall & Melhorn, LLC

(57) ABSTRACT

What is provided is a cargo bicycle apparatus and a kit for converting an existing bicycle into a cargo bicycle. The cargo bicycle apparatus comprises a cargo attachment that easily attaches and detaches from an existing bicycle to make the existing bicycle more utilitarian and functional. The cargo attachment connects with the existing bicycle in a way that prevents damage or permanent modification to the existing bicycle. Since no specialized tools or mechanical skills are required in the assembly of the cargo bicycle apparatus, the cargo attachment provides the operator with greater convenience and flexibility for converting an existing bicycle into a cargo bicycle apparatus. In addition, the cargo attachment is configured to automatically adjust to the geometry of nearly all existing bicycles without having to modify the geometry of the cargo attachment to match the geometry of a particular bicycle.

22 Claims, 14 Drawing Sheets

(51) Int. Cl.
*B62K 5/08* (2006.01)
*B62J 9/00* (2020.01)
*B62K 3/02* (2006.01)
*B62K 21/02* (2006.01)
*B62H 1/02* (2006.01)
*B62K 21/12* (2006.01)

(56) References Cited

U.S. PATENT DOCUMENTS

| | | | |
|---|---|---|---|
| 9,114,844 B2 | 8/2015 | Walter | |
| 2012/0091683 A1* | 4/2012 | McAndrews | B62K 19/22 280/276 |
| 2014/0091551 A1* | 4/2014 | Walter | B62K 13/04 280/267 |
| 2015/0314826 A1* | 11/2015 | Zusy | B62K 15/006 280/267 |

* cited by examiner

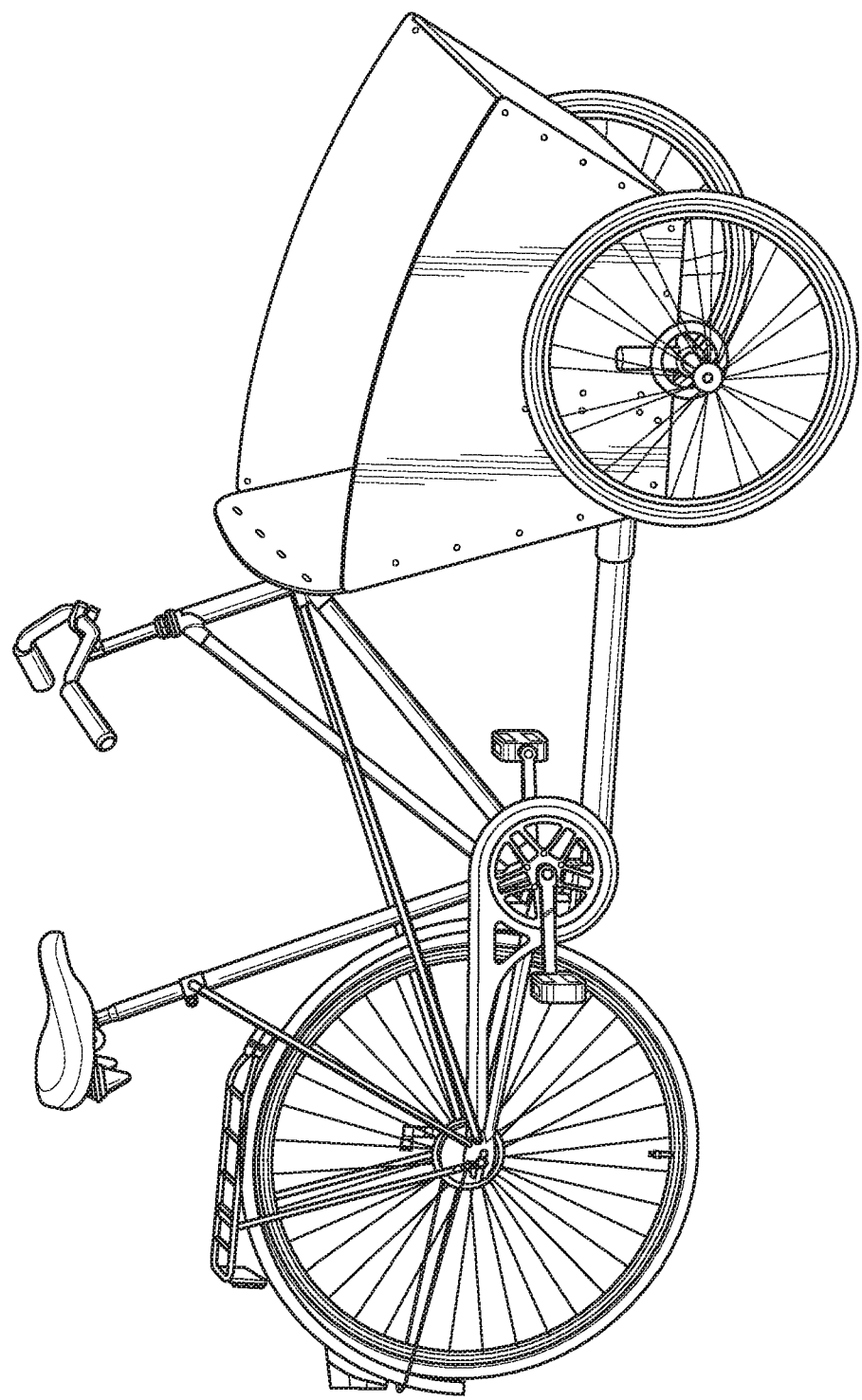

BICYCLE CONVERSION KIT AND CARGO
BICYCLE APPARATUS

PRIORITY CLAIM

This patent application is a Non-Provisional patent application and claims priority under 35 U.S.C. 119(e) to U.S. Provisional Patent Application Ser. No. 62/377,263, titled "BICYCLE CONVERSION KIT AND CARGO BICYCLE APPARATUS," filed Aug. 19, 2016. The entire disclosure of the aforementioned patent application is incorporated by reference as if fully stated herein.

FIELD

This patent application generally relates to self-propelled bicycles and more particularly to the conversion of a traditional/existing bicycle into a specialized functional bicycle, such as a bicycle with a cargo attachment.

BACKGROUND

Several different manually propelled bicycles and tricycles exist. Some of these bicycles and tricycles are adapted with baskets or other carriers to allow for safe and secure carriage of items. However, most of the baskets and carriers are attached separately to the back of the bicycle or tricycle, making them very difficult to see by the operator. The baskets and carriers that are attached in the front of the bicycle or tricycle are often very difficult to detach without causing damage or permanent modification to the bicycle or tricycle. In addition, these bicycles and tricycles are typically more difficult to safely operate than traditional bicycles.

In one instance, a traditional bicycle is converted to a functional tricycle with a cargo carrier attached to the front of the tricycle. The tricycle has the manual pedal system and steering of the traditional bicycle, along with a stable front frame carried by spaced front wheels that turn for cornering stability. However, larger cargo weight presented difficulties in the control and operability of this tricycle design, particularity when the operator is leaning into corners. Additionally, there are some limitations with regard to the types of bicycles that can be adapted into this tricycle apparatus due to the geometries of various components on the cargo carrier, such as the vertical mount or steerer tube.

In another instance, a traditional bicycle is converted to a functional bicycle with a cargo carrier attachment connected to the front of the bicycle. However, the cargo carrier attachment in this apparatus is rigidly coupled or fixed to the bike frame and limits the ability of the apparatus to rotate in various directions. As a result, components of the bicycle must be removed using special tools and mechanical skills in order to either install the cargo attachment bracket to the attachment point on the bicycle frame. In fact, the components of this design must be specifically and manually adjusted for each bicycle so that the geometry of the design matches that of the bicycle frame. In addition, the operator must expend significant time and energy to convert an existing bicycle into such an apparatus.

Consequently, there is a need for a bicycle conversion kit and cargo attachment that can more easily accommodate the transition of existing bicycles, including those with active suspension forks, into a cargo bicycle apparatus without the need for any specialized tools or mechanical skills. The geometries of the existing bicycle and cargo attachment should match or allow for relative motion between the bicycle and cargo attachment. The cargo bicycle apparatus must also provide greater functionality, balance, and overall operability to its operator.

SUMMARY

What is provided is a cargo bicycle apparatus and a kit for converting an existing bicycle into a cargo bicycle. The cargo bicycle apparatus comprises a cargo attachment that easily attaches and detaches from an existing bicycle to make the existing bicycle more utilitarian and functional. The cargo attachment connects with the existing bicycle in a way that prevents damage or permanent modification to the existing bicycle. Since no specialized tools or mechanical skills are required in the assembly of the cargo bicycle apparatus, the cargo attachment provides the operator with greater convenience and flexibility for converting an existing bicycle into a cargo bicycle apparatus. In addition, the cargo attachment is configured to automatically adjust to the geometry of nearly all existing bicycles without having to modify the geometry of the cargo attachment to match the geometry of a particular bicycle.

In exemplary embodiments, the cargo bicycle apparatus comprises an existing bicycle comprising a rear wheel, a primary frame, a steering mechanism including handle bars connected to the front fork and journaled to the primary frame for turning the front fork, and a primary frame head tube supporting the front fork, wherein the primary frame head tube is mounted at an angle with respect to the ground. The cargo bicycle also comprises a cargo attachment securely coupled to the existing bicycle, the cargo attachment comprises at least one front wheel, a first attachment position engaged with the front fork, wherein the first attachment comprises a cargo attachment head tube that is mounted at angle with respect to the ground, and wherein the cargo attachment head tube angle may be different than the primary frame head tube angle.

In exemplary embodiments, the first attachment position comprises a cargo attachment head tube mounted on a cargo frame; a forward attachment axle for engaging with a pair of front fork dropouts; a fork carriage and at least one linear bearing, wherein the at least one linear bearing facilitates the translation of the forward attachment axle and the fork carriage in the forward and backward directions.

In exemplary embodiments, the cargo attachment further comprises a second attachment position engaged with the primary frame, and wherein the primary frame is configured to rotate with respect to the cargo attachment about at least one axis. The second attachment position may comprise a yoke positioned on the end of the cargo frame, wherein the yoke is slidably attached to a post connected to the primary frame allowing for rotation of the cargo attachment in the general longitudinal, lateral, and vertical directions.

In other embodiments, the cargo bicycle apparatus comprises an existing bicycle comprising a rear wheel; a primary frame; and a steering mechanism including handle bars connected to a front fork and journaled to the primary frame for turning the front fork; and a primary frame head tube supporting the steerable front fork, wherein the primary frame head tube is mounted at an angle with respect to the ground. The cargo bicycle apparatus further comprises a cargo attachment securely coupled to the existing bicycle, the cargo attachment comprises at least one front wheel and an attachment position engaged with the primary frame, wherein the primary frame is configured to rotate with respect to the cargo attachment about at least one axis.

In exemplary embodiments, the kit for converting an existing bicycle to a cargo bicycle comprises a cargo attachment capable of detachably coupling with the existing bicycle, wherein the cargo attachment comprises at least one front wheel, a first attachment position configured to engage with the front fork on the existing bicycle, wherein the first attachment position comprises a cargo attachment head tube mounted at angle with respect to the ground. The kit also comprises a steering mechanism on the exiting bicycle including handle bars connected to the front fork and journaled to the primary frame for turning the front fork, a rear wheel on the existing bicycle, and a primary frame head tube supporting the steerable front fork, wherein the primary frame head tube is mounted at an angle with respect to the ground, wherein the primary frame head tube angle is different than the cargo attachment head tube angle.

These and other aspects, objects, and features disclosed herein will be understood and appreciated by those skilled in the art upon reviewing the following specification and appended drawings.

Subject matter is particularly pointed out and distinctly claimed in the concluding portion of the specification. Claimed subject matter, however, as to structure, organization and method of operation, together with objects, features, and advantages thereof, may best be understood by reference to the following detailed description if read with the accompanying drawings in which:

FIG. 13 is a schematic side perspective view of an exemplary tricycle apparatus comprising a cargo attachment coupled to an existing bicycle.

DETAILED DESCRIPTION

In the following detailed description, numerous specific details are set forth in order to provide a thorough understanding of the examples as defined in the claimed subject matter, and as an example of how to make and use the examples described herein. However, it will be understood by those skilled in the art that claimed subject matter is not intended to be limited to such specific details, and may even be practiced without requiring such specific details. In other instances, well-known methods, procedures, and devices have not been described in detail so as not to obscure the invention defined by the claimed subject matter.

The apparatus disclosed herein is provided for converting an existing bicycle into a functional bicycle cargo apparatus comprising a cargo attachment having a carrier and the existing bicycle. The subject matter disclosed herein can be provided as a kit for converting an existing bicycle to a functional bicycle comprising a bicycle cargo apparatus comprising a cargo attachment and the existing bicycle, or it can be part of an original complete bicycle cargo apparatus. When assembled, the bicycle cargo apparatus becomes a functional bicycle, using the manual pedal system and steering (and frame and braking) of the existing bicycle, but replacing the front wheel of the existing bicycle with a cargo attachment.

Figure 1:
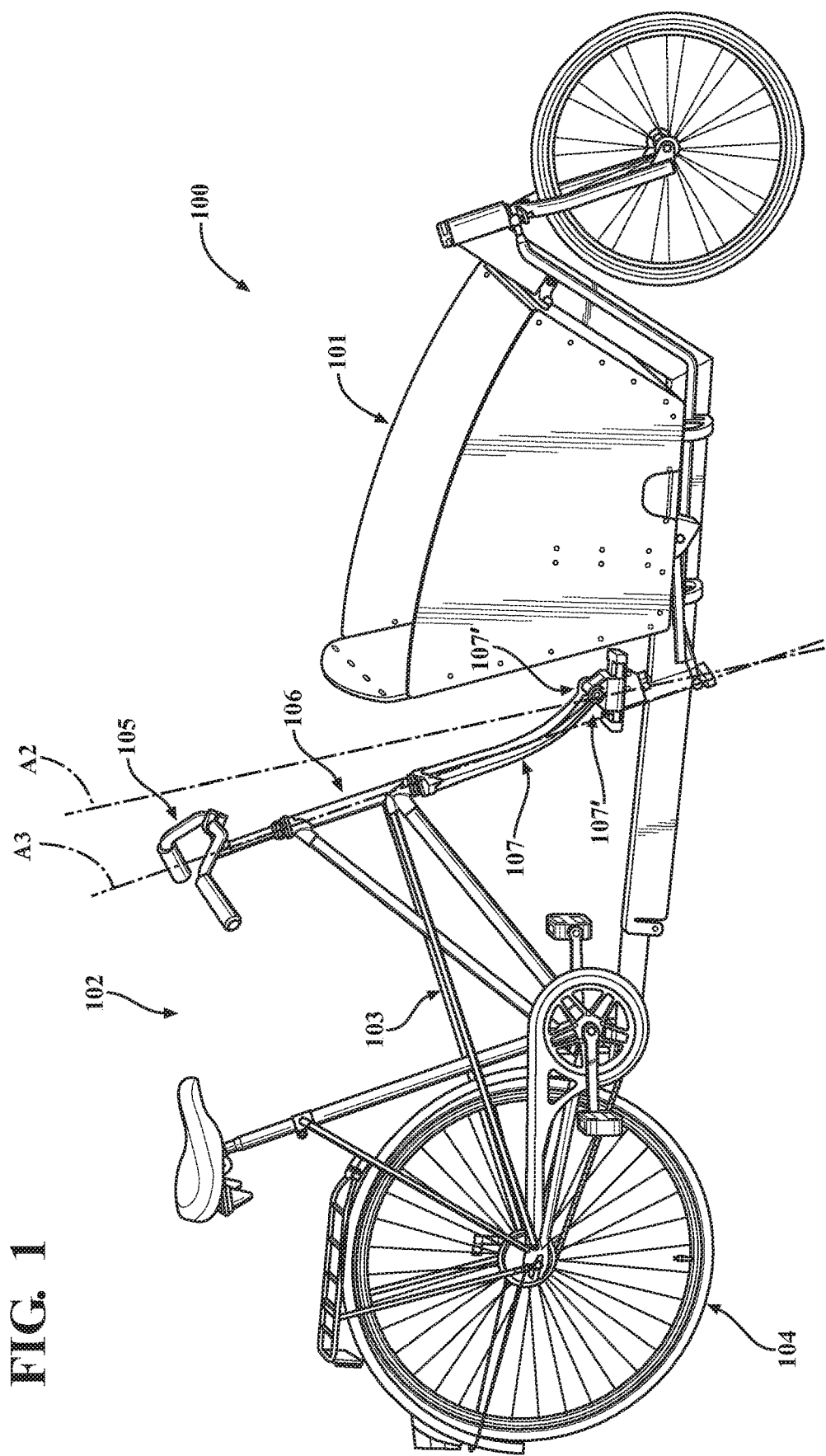
FIG. 1 is a schematic side perspective view of an exemplary apparatus comprising a cargo attachment coupled to an existing bicycle.
Figure 2:
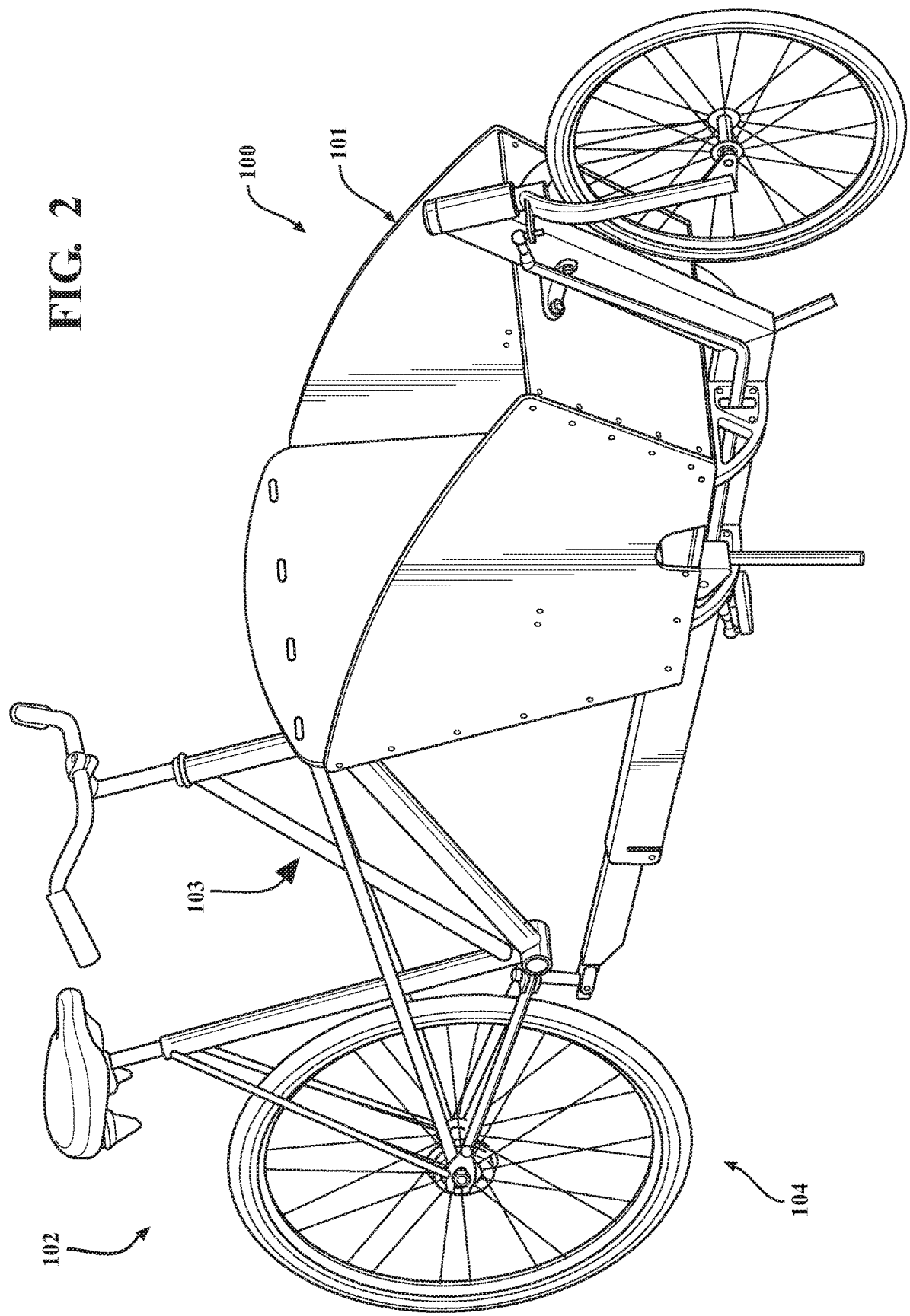
FIG. 2 is a schematic front perspective view of the apparatus of FIG. 1.
Figure 3:
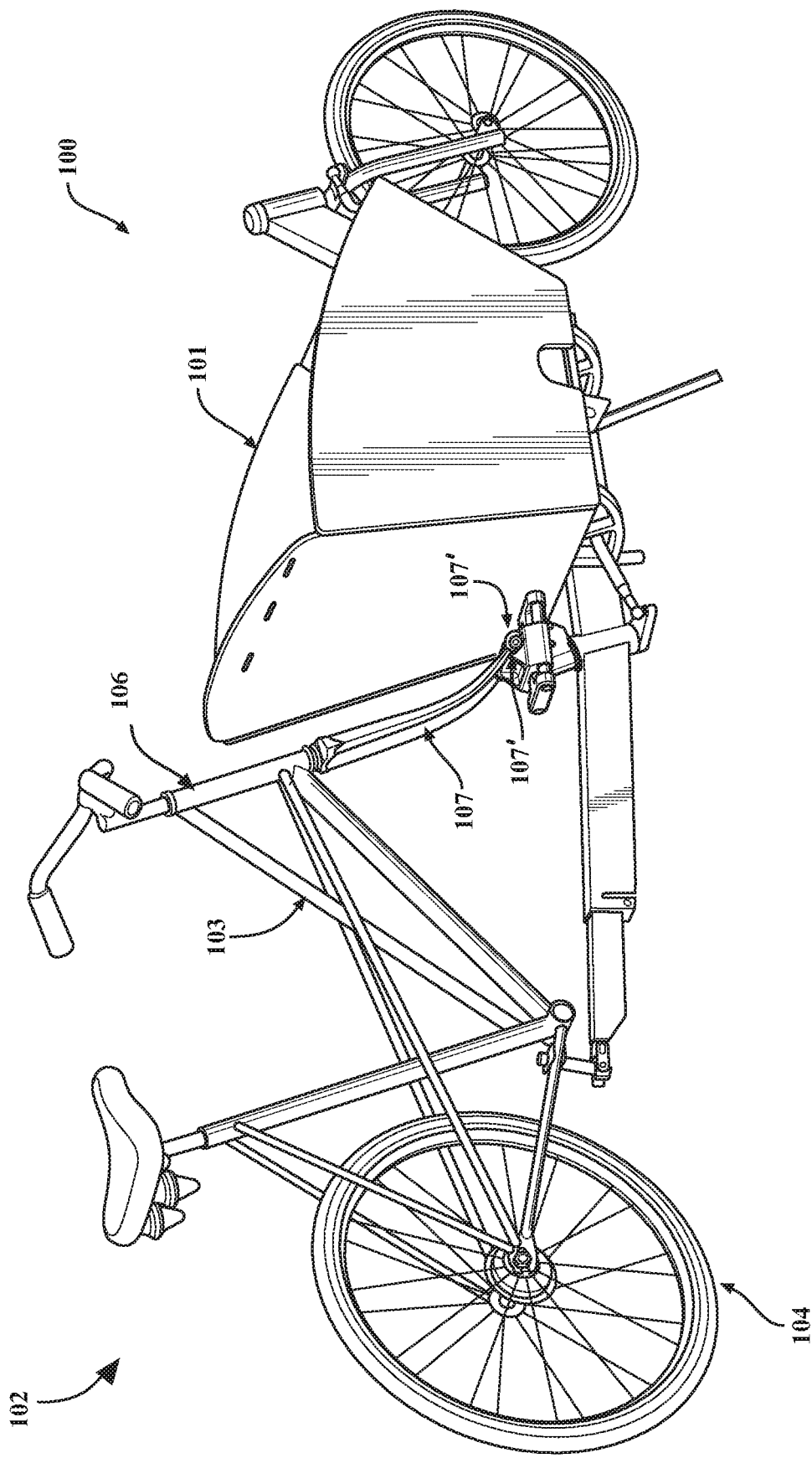
FIG. 3 is schematic another perspective view of the apparatus of FIG. 1.

Referring to FIG. 1, FIG. 1 shows a side perspective view of an exemplary apparatus 100 comprising a cargo attachment 101 coupled to an existing bicycle 102. The existing bicycle 102 includes a primary frame 103, a rear wheel 104, and a steering mechanism including handle bars 105 connected to a primary frame head tube 106, which is connected to a front fork 107. The handle bars 105 are journaled to the primary frame 103 for turning the front fork 107. The front fork 107 includes a pair of front fork dropouts 107' that are configured to allow easy removal of a front wheel from the existing bicycle 102.

The primary frame head tube 106 defines the axis (primary frame steering axis "A3") about which the front fork 107 rotates during the steering or turning of the apparatus 100. The angle 106A of the primary frame head tube 106, as defined by the primary frame steering axis A3, provides stabilization to the apparatus 100. The primary frame head tube angle 106A is not vertical with respect to the ground. In some examples, the primary frame head tube angle 106A is swept back about 62.5 to 77.5 degrees with respect to the ground. As a result, the front fork 107 translates with respect to the cargo attachment 101.

Figure 4:
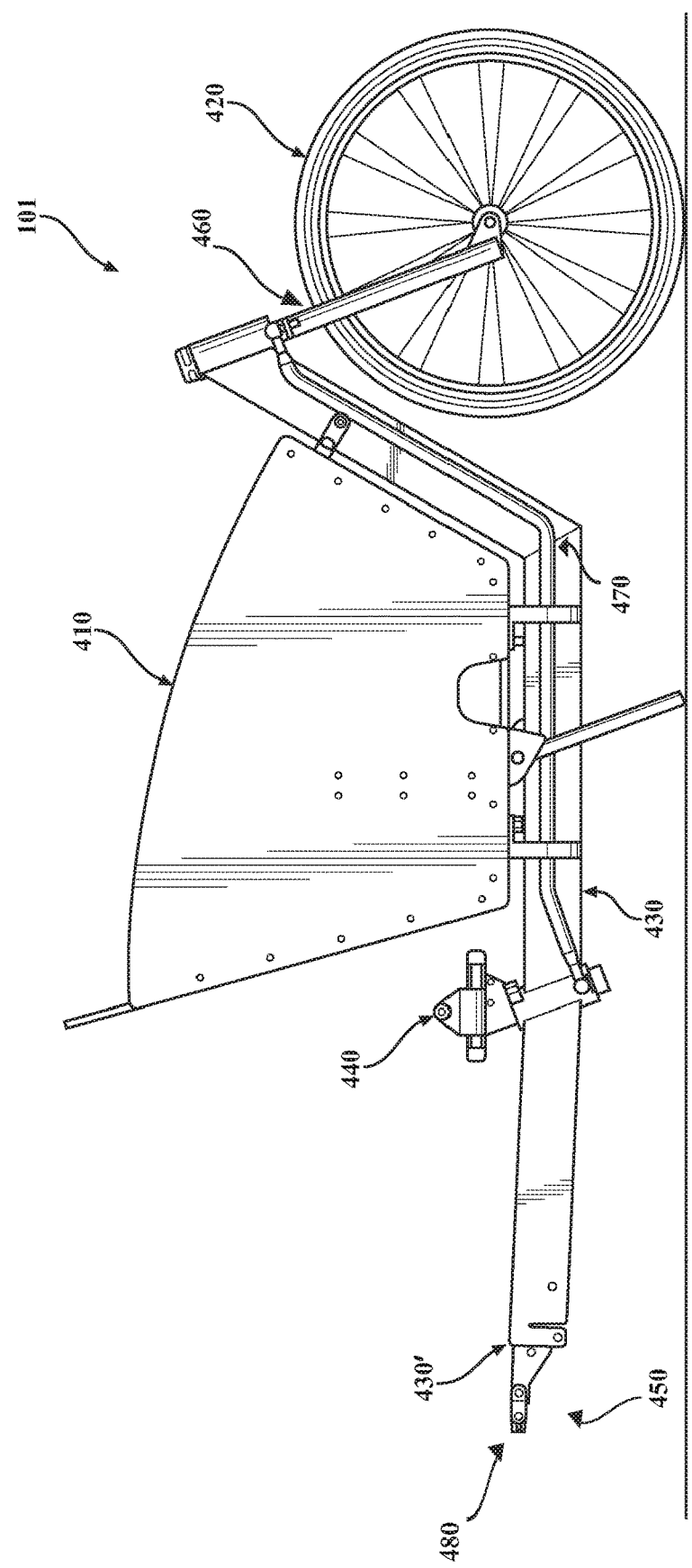
FIG. 4 is a schematic side perspective view of the cargo attachment of FIG. 1 having a first attachment position and a second attachment position.

Referring to FIG. 4, FIG. 4 shows a side perspective view of the cargo attachment 101 of FIG. 1 having a first attachment position 440 and a second attachment position 450. The cargo attachment 101 comprises a carrier 410, a front wheel 420, a cargo frame 430 including a tongue portion 430', a yoke 480 connected to the end of the tongue portion 430', and a cargo attachment fork 460 that is operably connected to the first attachment position 440 by a connecting rod 470, cables, or functionally equivalent means for steering the front wheel 420. The carrier 410 is positioned between the first attachment position 440 and the front wheel 420 so that the operator of the apparatus 100 can easily view the cargo in the carrier 410 while maintaining a stable center of gravity and the ability to lean into corners for cornering stability.

The first attachment position 440 on the cargo attachment 101 is configured to attach with the front fork dropouts 107' of the existing bicycle 102. In some examples, the second attachment position 450 on the cargo attachment 101 is the yoke 480 positioned on the end of the tongue portion 430'. The tongue portion 430' is configured to extend back to the primary frame 103 of the existing bicycle 102 to counteract any overturning moment on the cargo attachment 101. The ability to transfer the overturning moment to the primary frame 103 of the existing bicycle 102, instead of to the front fork 107, allows the cargo attachment 101 to safely carry more weight since primary frames are typically of a more structurally substantial design than forks. In other examples, a cargo attachment may comprise two connected front wheels that form a cargo tricycle apparatus when the cargo attachment is connected to an existing bicycle, as shown in FIG. 13.

In other examples, the cargo attachment 101 may be configured to attach to the primary frame 103 of the existing bicycle 102 at different locations on the existing bicycle 102 and/or at more than two attachment points. In some examples, cargo attachments are configured to attach to only the rear of existing bicycles, not the forks of existing bicycles.

Figure 5:
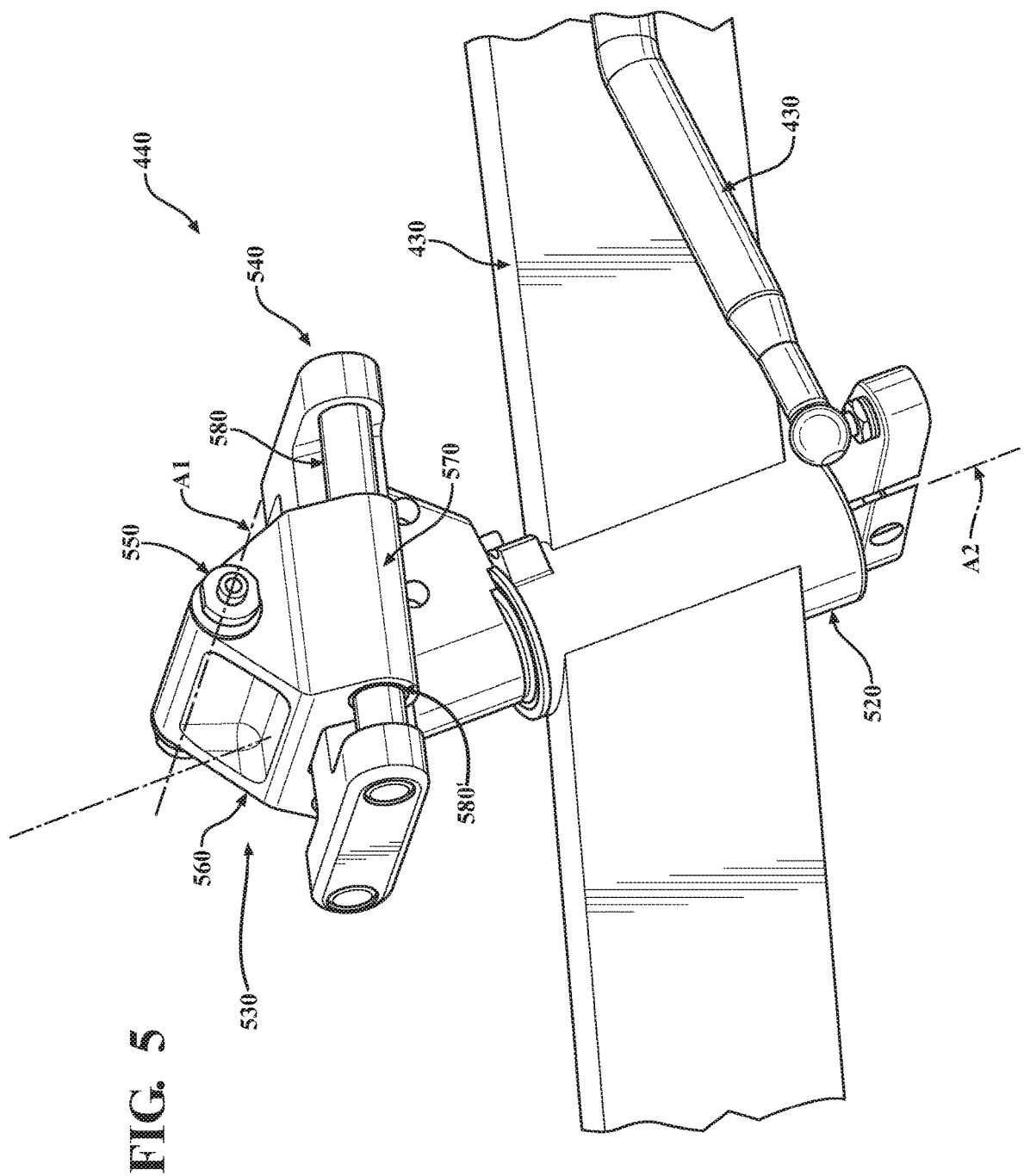
FIG. 5 is a schematic enlarged perspective view of the first attachment position on the cargo attachment of FIG. 1.

Referring to FIG. 5, FIG. 5 shows an enlarged perspective view of the first attachment position 440 on the cargo attachment 101 of FIG. 1. As shown in FIG. 5, the first attachment position 440 comprises a cargo attachment head tube 520 connected to the cargo frame 430, an axle assembly 530, and a slider assembly 540 separating the axle assembly 530 from the cargo attachment head tube 520. The axle assembly 530 comprises a forward attachment axle 550, an axle housing 560 separated from the forward attachment axle 550 by axle bearings, and a forward attachment axis A1 defined by the forward attachment axle 550.

The attachment of the fork dropouts 107' to the forward attachment axle 550 allows the front fork 107 to be rotatable about the forward attachment axis A1. This then permits the forward attachment axis A1 to be moveable in the forward and rearward directions. The fork dropouts 107' are mechanically, but not rigidly coupled (via welding or a functionally similar rigid technique) to the forward attachment axle 550. Rotation of the front fork 107 allows for geometry changes due to the deflection of the front fork 107 during changes in loading during its operation. The front fork 107 can rotate about the forward attachment axis A1 because the axle bearings allow the forward attachment axle 550 to rotate with respect to the axle housing 560. As a result, there is relative motion between the cargo attachment 101 and the primary frame 103 of the existing bicycle 102 allowing the cargo attachment 101 to adjust to variations in the dimensions of the existing bicycle 102.

As shown in FIG. 5, the slider assembly 540 comprises a fork carriage 570 and at least one linear bearing 580'. In the embodiment shown in FIG. 5, the at least one linear bearing 580' is journaled to a pin known as a slider shaft 580. The at least one linear bearing 580' is a plastic bushing that is pressed into the fork carriage 570 and slides on the slider shaft 580.

The at least one linear bearing 580' facilitates the forward and backward translation of the forward attachment axle 550 and the fork carriage 570 with respect to the cargo attachment 101. In addition, the forward attachment axle 550 may rotate about the axle bearings and the forward attachment axis A1, but is prevented from rotating or tilting in any other axis. The sliding motion or translation allows the cargo attachment 101 to automatically adjust to variations in bicycle dimensions, such as distances between the steering axis and the front wheel center axis on a bicycle. Specifically, the cargo attachment 101 is configured for attachment to bicycles where the front forks are suspension forks, which are typically of a telescoping design and not locked in place during movement of the apparatus 100. The telescoping design results in changes to the overall length of front forks and positions on primary frames of bicycles during movement of the apparatus 100. Thus, the ability of the first attachment position 440 to translate and rotate allows the cargo attachment 101 to automatically adjust to changes in the lengths of the front fork and fit virtually any size of bicycle frame.

In other embodiments, a carriage assembly may be translatingly moveable in the forward and backward directions without the use of any slider shafts or spaced apart pins. Instead, linear of components of the slider assembly may be achieved through the use of the fork carriage 570 and at least one linear bearing 580' by using a carriage and rail guide to produce a rolling action, instead of a sliding action.

Figure 6:
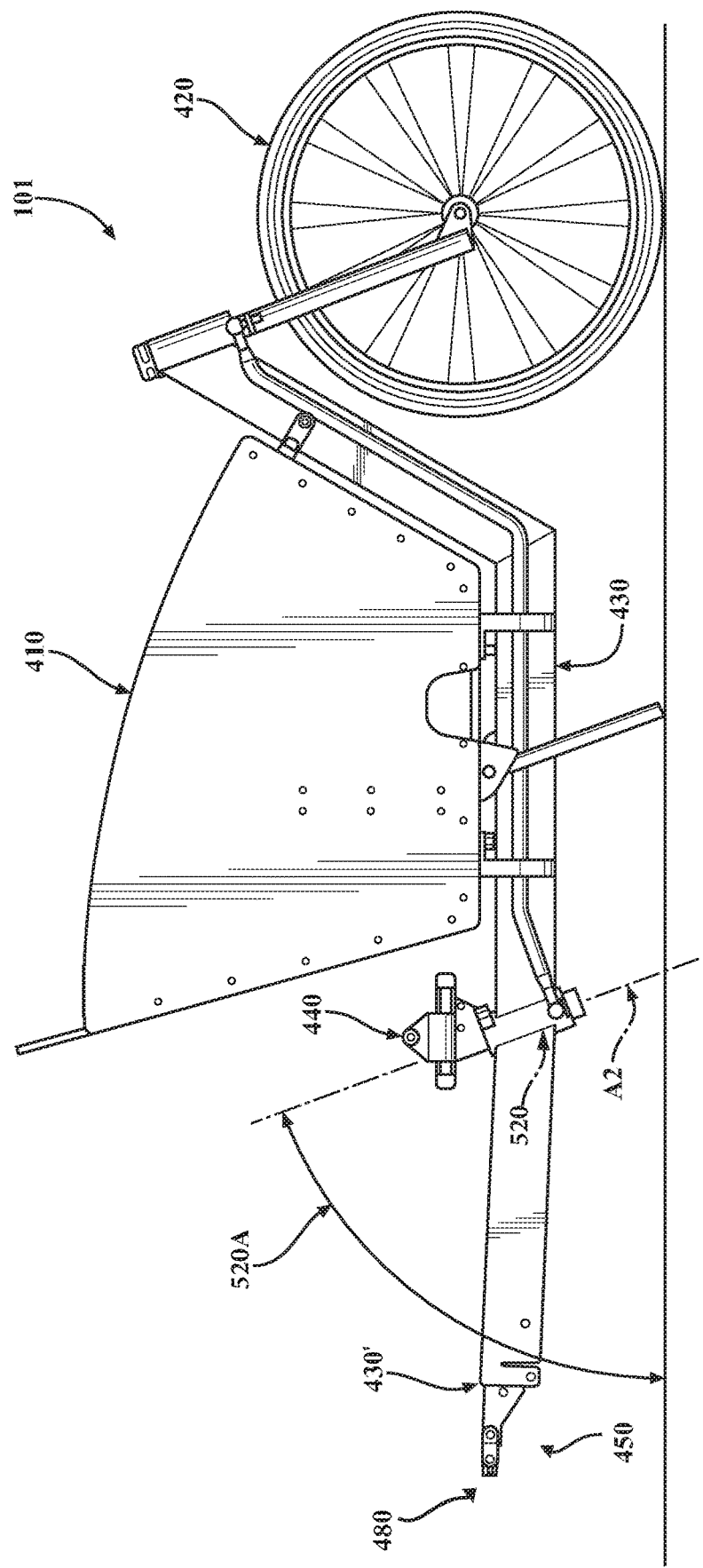
FIG. 6 is another schematic side perspective view of the cargo attachment of FIG. 4.

Referring to FIG. 6, FIG. 6 shows another side perspective view of the cargo attachment 101 of FIG. 4. As shown in FIG. 6, the cargo attachment head tube 520 is mounted at a cargo attachment head tube angle 520A (defined by the "steering axis" A2) with respect to the ground. The cargo attachment head tube angle 520A allows the first attachment position 440 to provide stabilization and control to the cargo attachment 101. As shown in FIG. 6, the cargo attachment head tube angle 520A is not vertical or perpendicular to the ground, but is instead swept back about 70 degrees with respect to the horizontal ground. As a result, the steering axis A2 is also angled rearward at about 70 degrees with respect to the horizontal ground. In other embodiments, the cargo attachment head tube angle 520A may be vertical to the ground or 90 degrees.

Figure 12:
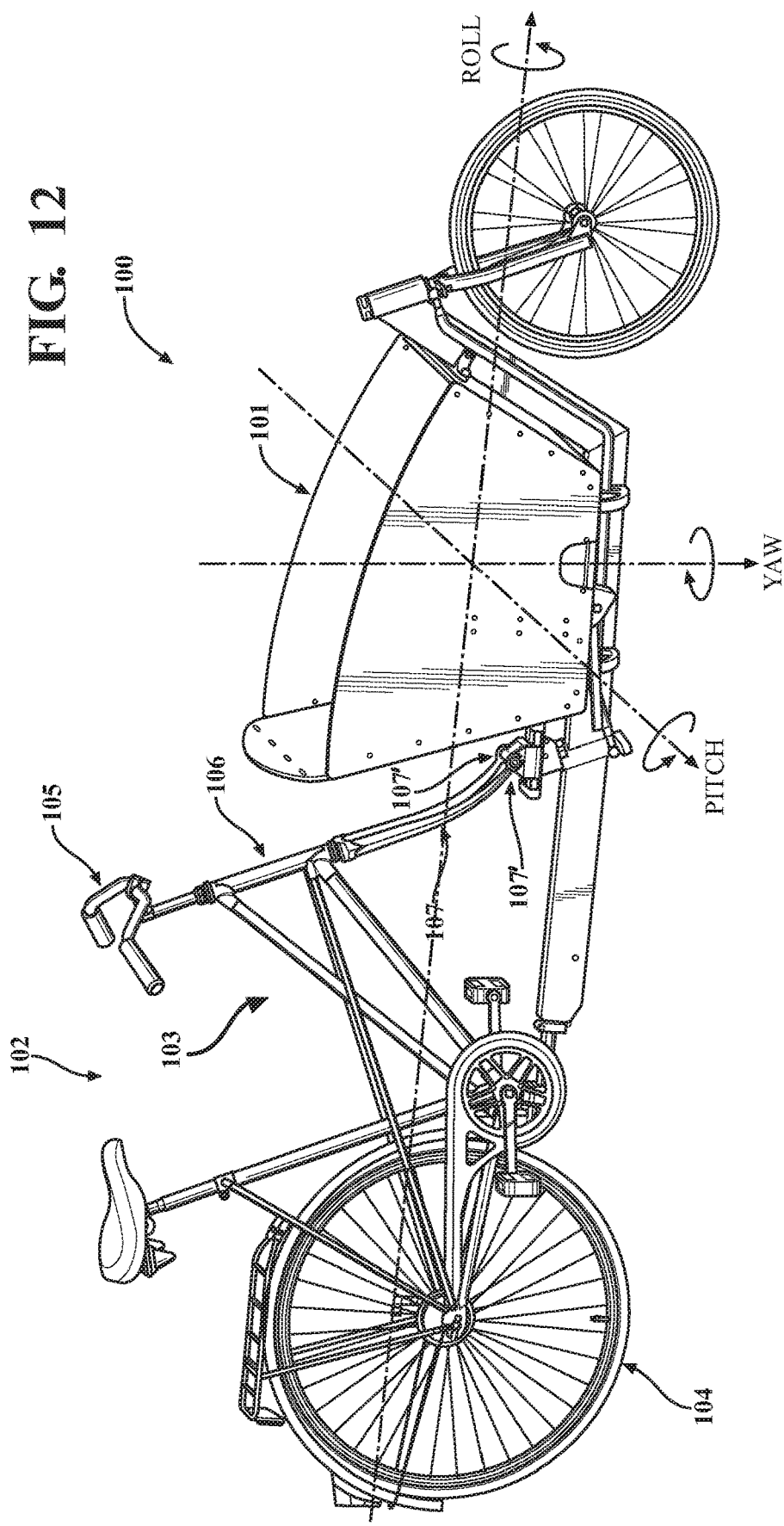
FIG. 12 is a schematic side perspective view of the cargo frame with respect to the primary frame on the apparatus of FIG. 1.
Figure 14C:
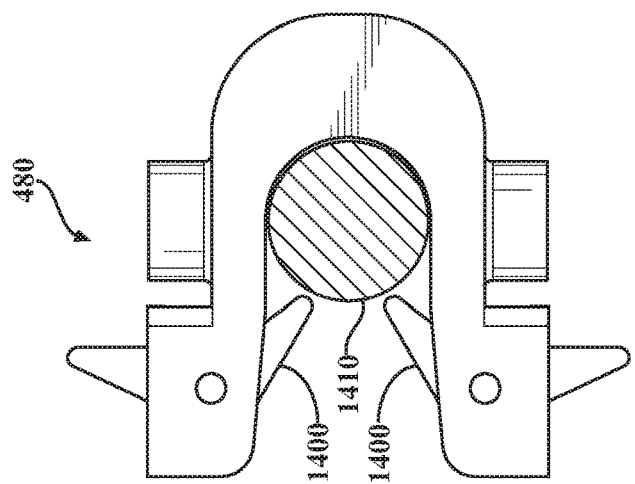
FIGS. 14A-C are schematic top perspective views of the yoke of FIG. 11 during insertion of an exemplary post on the primary frame.
Figure 14B:
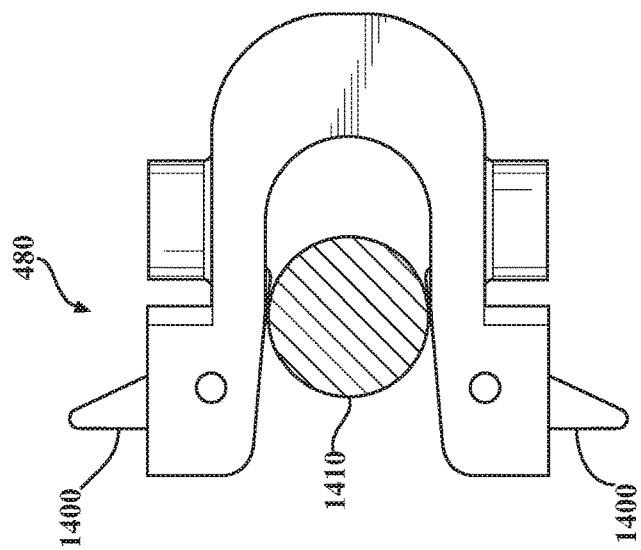
Figure 14A:
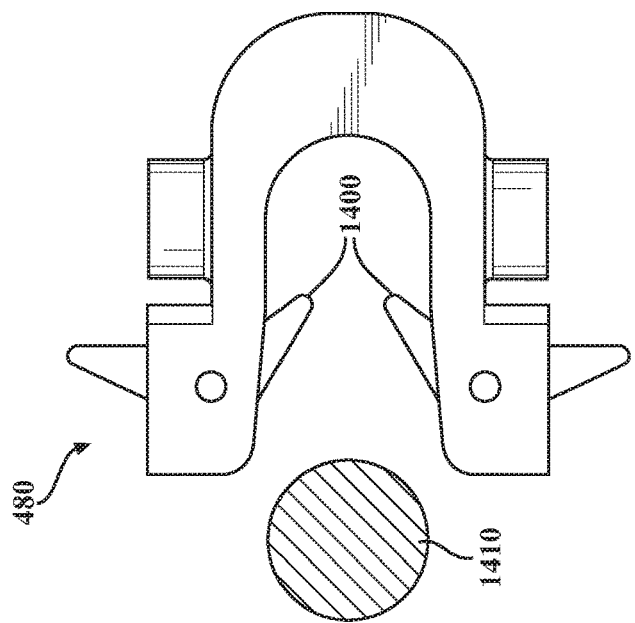

The cargo attachment head tube angle 520A is designed to be the mean angle found in a population of commonly used bicycles that are most likely to be used with a cargo attachment. In some examples, the cargo attachment head tube angle 520A is different than the primary frame head tube angle 106A. In these examples, the difference between the cargo attachment head tube angle 520A and the primary frame head tube angle 106A may be between about 0.1 and 30 degrees. Thus, the difference between the cargo attachment head tube angle 520A and the primary frame head tube angle 106A is about +/30 degrees, for a total of about 60 degrees. In order to accommodate any differences between the cargo attachment head tube angle 520A and the primary frame head tube angle 106A, the primary frame 103 is configured to rotate about at least one of the roll (longitudinal direction), pitch (lateral direction), and/or yaw (vertical direction) axes with respect to the cargo attachment 101 and the front fork 107 is configured to translate in the forward and backward directions with respect to the cargo attachment 101. In some examples, the cargo frame 430 is configured to rotate about each of the roll, pitch, and yaw axes with respect to the primary frame 103, as shown in FIG. 12.

In other examples, the cargo attachment head tube angle 520A may be approximately the same or exactly the same as the primary frame head tube angle 106A.

Figure 7:
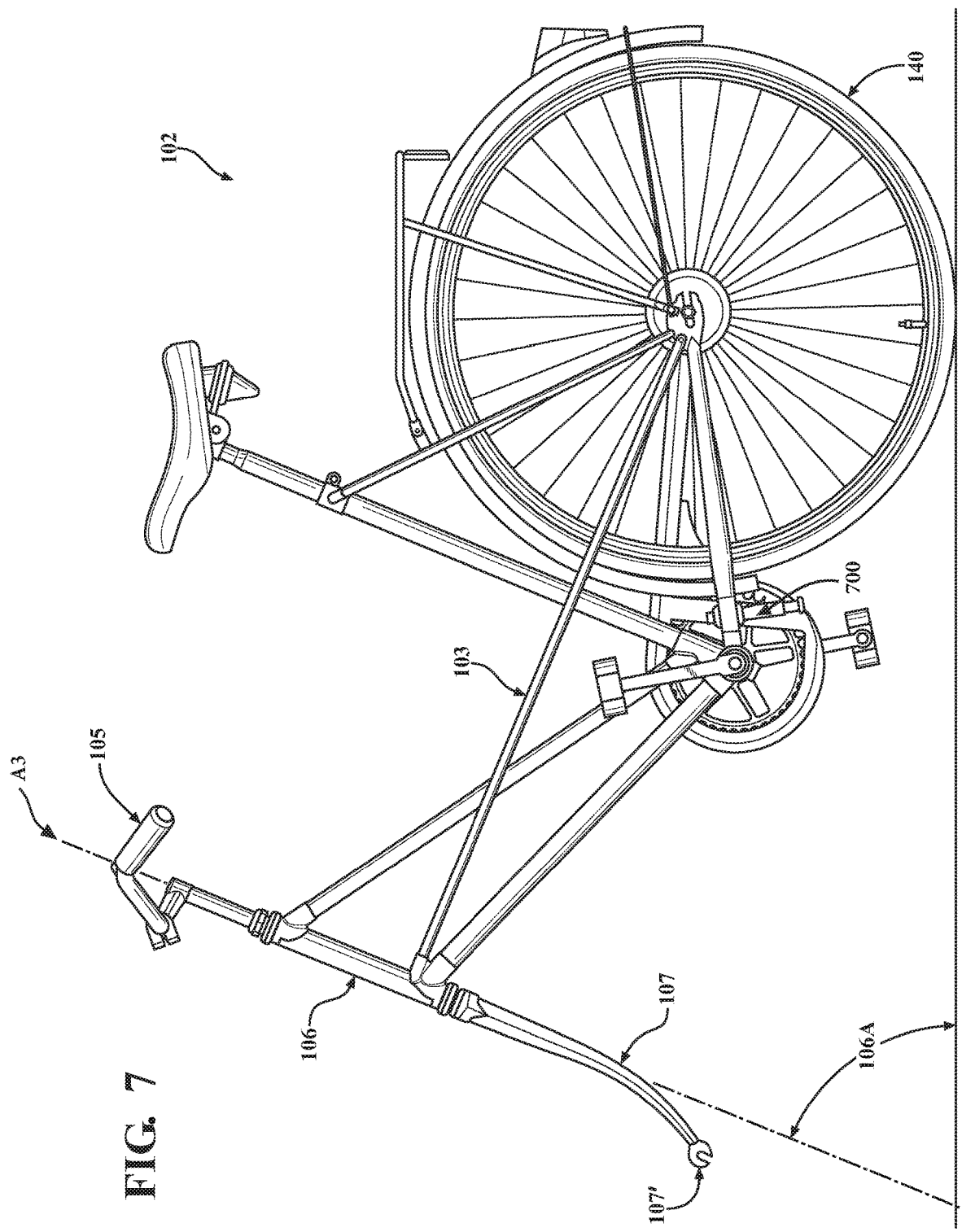
FIG. 7 is a schematic side perspective view of the existing bicycle of FIG. 1 without the cargo attachment.
Figure 8:
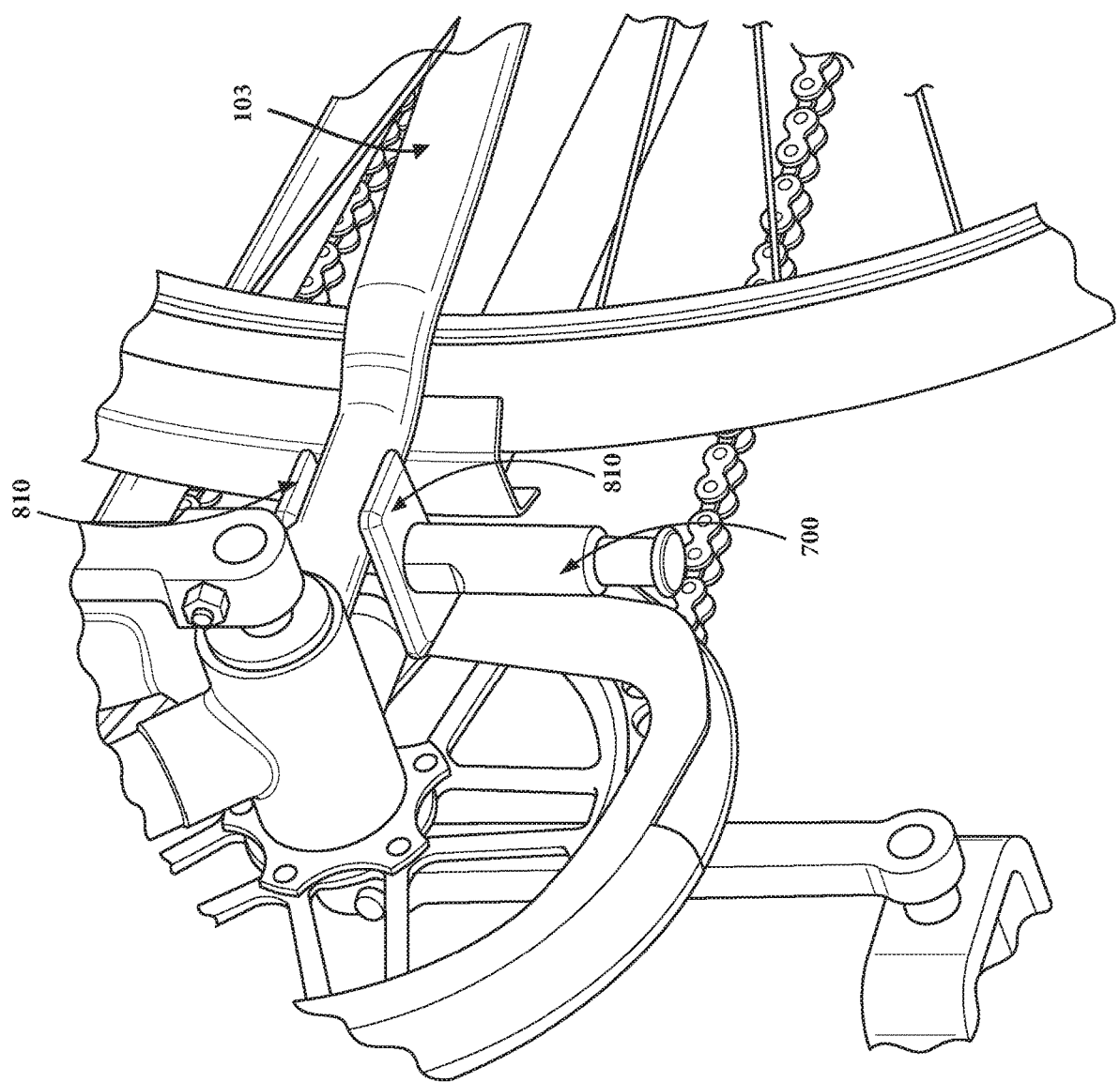
FIG. 8 is a schematic enlarged perspective view of the second attachment position engaged with the existing bicycle of FIG. 1.

Referring to FIG. 7, FIG. 7 shows a side perspective view of the existing bicycle 102 of FIG. 1. The existing bicycle 102 comprises a post 700 that is securely attached to the primary frame 103. In some examples, the post 700 is cylindrical and is fabricated from steel or a functionally equivalent metal. Referring to FIG. 8, FIG. 8 shows an enlarged perspective view second attachment position 450 engaging with the existing bicycle 102 of FIG. 1 to form the cargo bicycle apparatus 100. As shown in FIG. 8, the post 700 is securely attached to the primary frame 103 with two clamping plates 810, along with a bolt and a lock washer. In another embodiment, the post 700 is securely connected to the primary frame 103 by a component that produces a clamping force on the post 700. In such an embodiment, the primary frame 103 may have a mounting plate for a kickstand, in which case, no clamping plates are required and the post 700 may be secured directly to the kickstand mounting plate of the primary frame 103 using a bolt and a lock washer.

Figure 9:
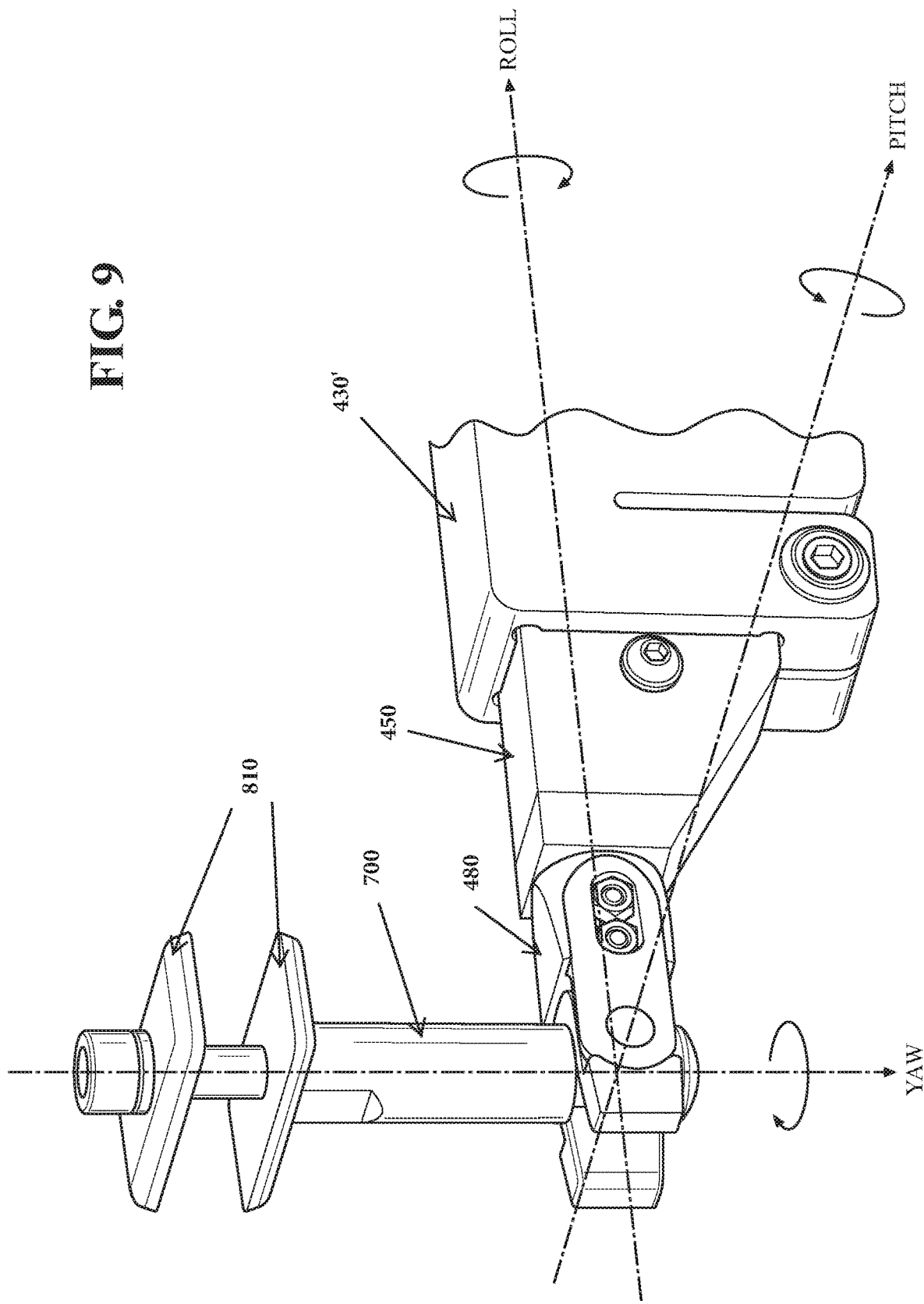
FIG. 9 is another schematic enlarged perspective view of the second attachment position engaging with a portion of the existing bicycle of FIG. 1.

Referring to FIG. 9, FIG. 9 shows another enlarged perspective view of the second attachment position 450 engaging with the existing bicycle 102 of FIG. 1. As shown in FIG. 9, the post 700 creates a generally, vertically oriented axis or an axis generally in the yaw direction upon engagement with the yoke 480. The yoke 480 is positioned on the end of the tongue portion 430' and is configured to slidably attach to the post 700. Consequently, three axes are provided that allow the primary frame 103 to rotate about the roll, pitch, and yaw directions with respect to the cargo attachment 101 when the primary frame 103 is attached to the second attachment position 450.

This allows the cargo attachment 101 to be attached to different bicycles without having to modify the geometry of the cargo attachment 101 to match the geometry of a particular bicycle. Thus, the cargo attachment 101 is configured to automatically adjust to the geometry of the attached bicycle.

Figure 10:
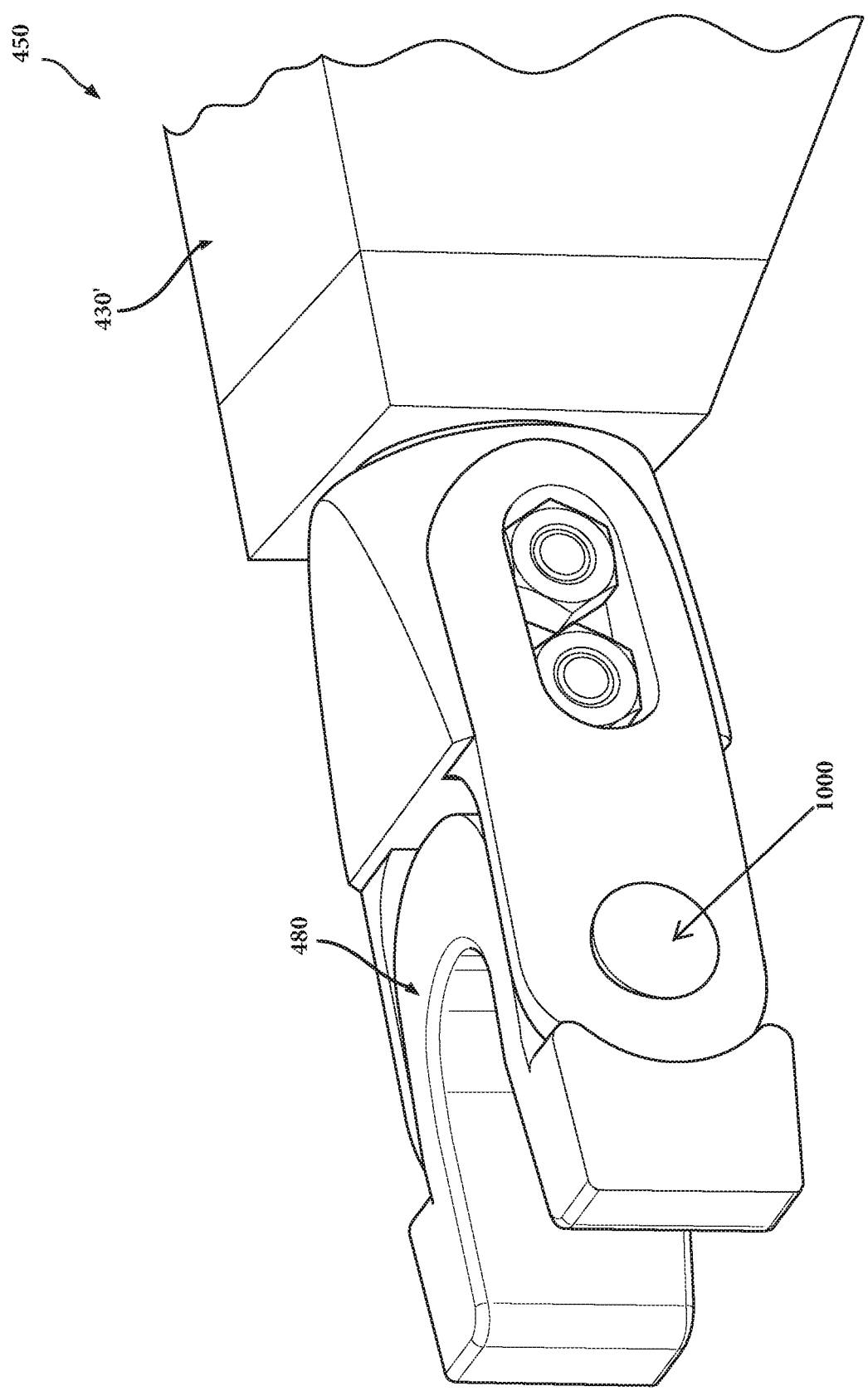
FIG. 10 is a schematic perspective view of the second attachment position of FIG. 9.
Figure 11:
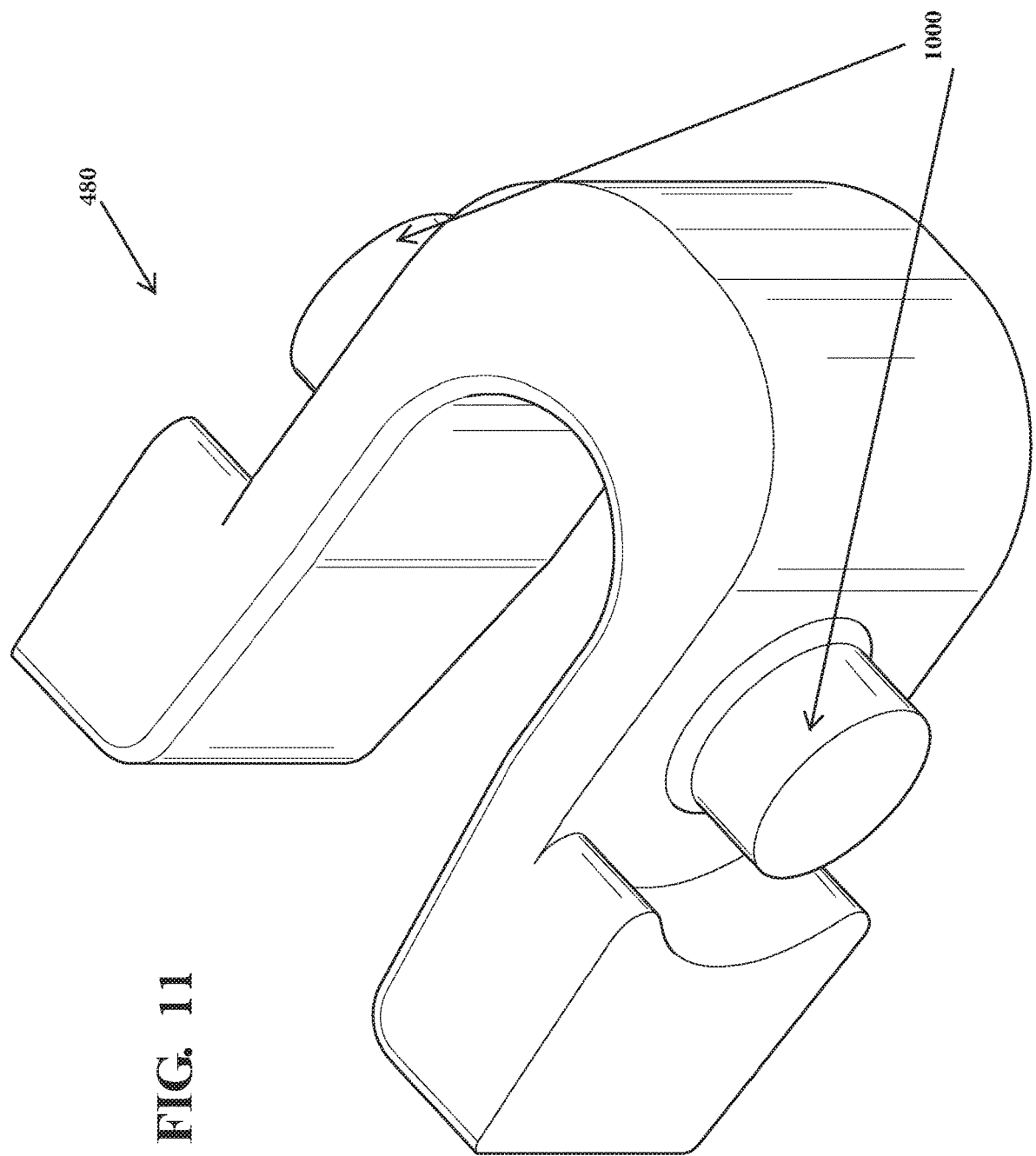
FIG. 11 is a schematic top perspective view of an exemplary yoke of the second attachment position of FIG. 9.

FIG. 10 shows a side perspective view of the second attachment position 450 of FIG. 9. The yoke 480 comprises two cylindrical, opposing bosses 1000 on each side, as shown in FIG. 11. The bosses 1000 create a generally horizontally-oriented axis that runs laterally to the primary frame 103, or an axis in the general pitch direction. In some embodiments, the yoke 480 is secured to a shaft having a cylindrical extension. The cylindrical extension creates another generally horizontally-oriented axis that runs longitudinally to the primary frame 103, or an axis in the general roll direction. As shown in the embodiments of FIG. 14 FIGS. 14A-C, the yoke 480 comprises two latches 1400 that rotate out of the way when the yoke 480 slides onto a bracket portion 1410 on the post 700. In this embodiment, the latches 1400 may be spring-loaded such that they rotate inwards once the post 700 is fully seated into the yoke 480. The post 700 is then unable to prematurely slide out of the yoke 480 unless the latches 1400 are manually retracted. In other embodiments, the yoke 480 does not comprise any latches or comprises only one latch.

The interaction of the post 700 with the yoke 480 at the second attachment position 450 limits the amount of rotation about the roll axis to about 3.5 degrees in either direction. Thus, the primary frame 103 can only rotate with respect to the cargo attachment 101 about the roll axis by a total amount of about 7 degrees. Conversely, the cargo attachment 101 can only rotate, with respect to the primary frame 103, about the roll axis by a total amount of about 7 degrees. This rotation limit is achieved through the use of a cam plate. The cam plate is then journaled into a square bore. The geometry of the cam plate and the square bore limit the amount of rotation in any one direction to 3.5 degrees.

The cargo attachment 101 can be easily attached to and detached from the primary frame 103 at the second attachment position 450 without the need for any specialized tools or mechanical skills. Components of the existing bicycle 102 do not need to be removed to allow for the assembly of the apparatus 100. As a result, the operator may quickly and conveniently attach the cargo attachment 101 to the existing bicycle 102.

The cargo attachment 101 disclosed herein can be attached to most existing bicycles having a primary frame, a rear wheel, and a steering mechanism including handle bars connected to a fork. In order to allow for attachment to most existing bicycles, the fork carriage 570 on the cargo attachment 101 needs to be able to translate back and forth, as well as being able to rotate with respect to the forks of existing bicycles. The translation and rotation allow suspensions forks on existing bicycles to freely extend and contract into desired positions on the apparatus 100.

The carrier 410 (as shown in FIGS. 1-4) is a box-like or wheelbarrow-like structure having rigid sides and a bottom made of wood, plastic, metal, polymeric material, or functionally equivalent combinations and variations thereof. The carrier 410 has an upwardly open container, box, seat, rickshaw, platform, or the like. The carrier 410 is attached to the cargo frame 430 by screws or a quick-release clamp (not specifically shown, but known in the field and commercially available). In some examples, the carrier 410 may be used for carrying goods, such as groceries or other bagged items; people, such as children, a handicapped person, or a wheelchair bound person; pets; or vendor-related items, such as an ice chest or an insulated/heated box. In some examples, the carrier 410 can be releasably attached to the cargo frame 430. In other examples, the front panel of the carrier 410 could be pivoted or tipped forward to form a ramp into the carrier 410 for receiving a wheelchair or a wheeled cart for carriage.

It will, of course, be understood that, although particular examples have just been described, the claimed subject matter is not limited in scope to a particular example or limitation. Likewise, an example may be implemented in any combination of compositions of matter, apparatuses, methods or products made by a process, for example.

In the preceding description, various aspects of claimed subject matter have been described. For purposes of explanation, specific numbers, percentages, components, ingredients and/or configurations were set forth to provide a thorough understanding of claimed subject matter. However, it should be apparent to one skilled in the art having the benefit of this disclosure that claimed subject matter may be practiced without the specific details. In other instances, features that would be understood by one of ordinary skill were omitted or simplified so as not to obscure claimed subject matter. While certain features and examples have been illustrated or described herein, many modifications, substitutions, changes or equivalents will now occur to those skilled in the art. It is, therefore, to be understood that the appended claims are intended to cover all such modifications or changes as fall within the true spirit of claimed subject matter.

The invention claimed is:

1. A cargo bicycle apparatus comprising:
   an existing bicycle comprising:
      a front fork;
      a rear wheel;
      a primary frame;
      a steering mechanism including handle bars connected to the front fork and journaled to the primary frame for turning the front fork; and
      a primary frame head tube supporting the steerable front fork, wherein the primary frame head tube is mounted at an angle with respect to the ground; and
   a cargo attachment securely coupled to the existing bicycle, the cargo attachment comprising:
      at least one front wheel;
      a first attachment position engaged with the front fork, wherein the first attachment position comprises a cargo attachment head tube, wherein the cargo attachment head tube defines a cargo attachment head tube axis; and a forward attachment assembly, wherein the forward attachment assembly defines a forward attachment axis, wherein the forward attachment axis is at an angle with respect to the cargo attachment head tube axis, and wherein the forward attachment angle remains the same during rotation of the forward attachment axis about the cargo attachment head tube axis.

2. The cargo bicycle apparatus of claim 1, wherein the front fork comprises a pair of front fork dropouts, wherein the pair of front fork dropouts is engaged with the first attachment position.

3. The cargo bicycle apparatus of claim 2, wherein the forward attachment assembly is configured to engage with the pair of front fork dropouts, a fork carriage, and at least one linear bearing, and wherein the at least one linear bearing allows for the translation of the forward attachment assembly and the fork carriage in the forward and backward directions with respect to the cargo attachment.

4. The cargo bicycle apparatus of claim 1, wherein the cargo attachment further comprises a second attachment position engaged with the primary frame, and wherein the primary frame is configured to rotate with respect to the cargo attachment about at least one axis.

5. The cargo bicycle apparatus of claim 4, wherein the second attachment position comprises a yoke positioned on an end of a cargo frame, wherein the yoke is secured to a shaft having a cylindrical extension.

6. The cargo bicycle apparatus of claim 5, wherein the yoke comprises two cylindrical, opposing bosses.

7. The cargo bicycle apparatus of claim 6, wherein the yoke is slidably attached to a post that is connected to the primary frame.

8. The cargo bicycle apparatus of claim 7, wherein the post is securely connected to the primary frame by a component that produces a clamping force on the post.

9. The cargo bicycle apparatus of claim 8, wherein the component is a clamping plate.

10. The cargo bicycle apparatus of claim 8, wherein the component is a kickstand mounting plate.

11. The cargo bicycle apparatus of claim 8, wherein the yoke comprises two opposing latches, wherein each of the latches is configured to rotate inwards once the post is fully positioned in the yoke to prevent the post from prematurely sliding out of the yoke.

12. The cargo bicycle apparatus of claim 11, wherein each of the latches are spring-loaded.

13. The cargo bicycle apparatus of claim 8, wherein the front fork is a suspension fork, and wherein the suspension fork freely extends and contracts during movement of the apparatus.

14. The cargo bicycle apparatus of claim 5, wherein the cargo attachment further comprises a carrier, wherein the carrier is releasbly attached to the cargo frame.

15. The cargo bicycle apparatus of claim 1, wherein the cargo attachment head tube is mounted at an angle with respect to the ground, and wherein the cargo attachment head tube angle is different than the primary frame head tube angle.

16. A kit for converting an existing bicycle to a cargo bicycle, the kit comprising:
a cargo attachment configured to selectively couple with the existing bicycle,
wherein the cargo attachment comprises:
at least one front wheel; and
a first attachment position engaged with a front fork on the existing bicycle, wherein the first attachment position comprises a cargo attachment head tube, wherein the cargo attachment head tube defines a cargo attachment head tube axis;
a forward attachment assembly, wherein the forward attachment assembly defines a forward attachment axis, wherein the forward attachment axis is at an angle with respect to the cargo attachment head tube axis, and wherein the forward attachment angle remains the same during rotation of the forward attachment axis about the cargo attachment head tube axis;
a steering mechanism on the existing bicycle including handle bars connected to the front fork and journaled to a primary frame for turning the front fork;
a rear wheel on the existing bicycle; and
a primary frame head tube supporting the steerable front fork, wherein the primary frame head tube is mounted at an angle with respect to the ground.

17. The kit of claim 16, wherein the front fork is configured to translate with respect to the cargo attachment.

18. The kit of claim 17, wherein the first attachment position comprises a fork carriage capable of translating forward and backward and rotating with respect to the front fork.

19. The kit of claim 17, wherein the second attachment position comprises a yoke positioned on the end of a cargo frame, wherein the yoke is capable of slidably attaching to a post securely connected to the primary frame.

20. The kit of claim 19, wherein the front fork is a suspension fork, and wherein the suspension fork freely extends and contracts during movement of the cargo bicycle.

21. The kit of claim 16, wherein the cargo attachment further comprises a second attachment position engaged with the primary frame.

22. The kit of claim 16, wherein the cargo attachment head tube is mounted at an angle with respect to the ground, and wherein the cargo attachment head tube angle is different than the primary frame head tube angle.

* * * * *